United States Patent [19]

Peterman et al.

[11] 4,438,069

[45] Mar. 20, 1984

[54] SYSTEM FOR TEMPERATURE CONTROL OF A CLAUS SULFUR UNIT THERMAL REACTOR

[75] Inventors: Lee G. Peterman, Flossmoor, Ill.; Raymond J. Staebel, Houston, Tex.

[73] Assignee: Atlantic Richfield Company, Philadelphia, Pa.

[21] Appl. No.: 335,912

[22] Filed: Dec. 30, 1981

[51] Int. Cl.$^3$ .......................................... G01N 33/00
[52] U.S. Cl. ...................................... 422/62; 422/111
[58] Field of Search ................. 422/108, 111, 114, 62, 422/194; 436/121; 423/573 R, 574 R

[56] References Cited

U.S. PATENT DOCUMENTS

Re. 28,864 6/1976 Andral et al. ..................... 422/110
3,970,743 7/1976 Beavon .............................. 422/189
3,985,864 10/1976 Vautrain et al. ................... 436/121

Primary Examiner—Hiram H. Bernstein
Attorney, Agent, or Firm—Donald L. Traut

[57] ABSTRACT

A system is disclosed for controlling the environment and temperature in the initial thermal reaction zone of an at least two-zone Claus thermal unit by means of control signals. Both a feed-back control and a feed-forward control are disclosed.

6 Claims, 4 Drawing Figures

FIG. I

REACTIONS IN THE THERMAL REACTOR

| MAIN REACTIONS | LOCATION(S) |
|---|---|
| (1) $H_2S + 3/2 O_2 \rightarrow SO_2 + H_2O$ | FIRST ZONE |
| (2) $2H_2S + SO_2 \rightarrow 3S + 3H_2O$ | FIRST AND SECOND ZONES AND CATALYTIC CONVERTERS |
| (3) $H_2S + 1/2 O_2 \rightarrow H_2O + S$ | FIRST ZONE |
| (4) $S + O_2 \rightarrow SO_2$ | FIRST ZONE |
| (5) $2NH_3 \rightarrow N_2 + 3H_2$ | FIRST ZONE |
| (6) $2NH_3 + 3/2 O_2 \rightarrow N_2 + 3H_2O$ | FIRST ZONE |
| (7) $2H_2 + O_2 \rightarrow 2H_2O$ | |
| (8) $N_2 + O_2 \rightarrow NO_X$ | |

SIDE REACTIONS (9) $SO_2 + 1/2 O_2 \rightarrow SO_3$     FIRST ZONE (10) $NH_3 + SO_3 + H_2O \rightarrow NH_4HSO_4$ (11) $2NH_3 + H_2S \rightarrow (NH_4)_2S$ (12) $CH_4 + 3/2 O_2 \rightarrow CO + 2H_2O$
     $CO_2 + H_2S \rightarrow COS + H_2O$ (13) $CH_4 + 2S_2 \rightarrow CS_2 + 2H_2S$

(14) $CH_4 + SO_2 \rightarrow COS + H_2O + H_2$ (15) $CO + 1/2 S_2 \rightarrow COS$

CLAUS REACTION.

$2H_2S + SO_2 \rightarrow 3S + 2H_2O$

Fig. 3
Claus Sulfur Recovery Unit
Automatic Control Scheme

SYSTEM FOR TEMPERATURE CONTROL OF A CLAUS SULFUR UNIT THERMAL REACTOR

BACKGROUND OF THE INVENTION

This invention relates to a process control system for a Claus sulfur plant. More specifically, this invention relates to a temperature control strategy for the initial reaction zone of a Claus thermal reactor having at least two reaction zones, wherein the relative concentrations of sulfur-containing reactants to molecular oxygen-containing reactants in the first reaction zone are varied.

Some art relevant to sulfur plants is discussed briefly hereinafter.

U.S. Pat. No. 3,970,743 (1976) to David K. Beavon discloses an improvement to the Claus process for sulfur manufacture which enables continuous operation even with hydrogen sulfide feeds which contain substantial quantities of fixed nitrogen compounds, e.g. ammonia. The inability of conventional Claus plants to tolerate more than 0.5 mole percent ammonia in feed gases is mentioned. Also mentioned are the difficulties from plugging that arises while processing hydrogen sulfide-fixed nitrogen compound feed streams, e.g., $H_2S-NH_3$ mixtures. Generally, in order to decompose all ammonia, high temperatures are to be preferred, and in order to decrease the concentration of sulfur trioxide produced, higher temperatures are also to be preferred. And, finally, the optimum conditions to run the reaction of hydrogen sulfide to sulfur dioxide are such that there is a deficiency of oxygen present, i.e. an "oxygen-lean" condition. The specific improvement disclosed involves a thermal reactor having first and second zones in series. The first reaction zone contains air, fixed nitrogen compounds and hydrogen sulfide. The reaction product from the first zone is then mixed with additional hydrogen sulfide in the second reaction zone. The desired stoichiometry of the Claus reaction in terms of the amounts of oxygen and hydrogen sulfide necessary is discussed.

Not discussed in U.S. Pat. No. 3,970,743 (1976), however, is the desirability and the strategy to control temperature in the first zone of the thermal reactor. Good temperature control in the first zone of the thermal reactor is very important in order: to avoid damage to the unit from runaway thermal conditions, to maximize ammonia decomposition, and to minimize the amount of sulfur trioxide produced during oxidation in the first zone of a thermal reactor.

U.S. Pat. No. 3,985,864 (1976) of Lucien H. Vautrain, et al., and Re. 28,864 (1976) of Andval, et al., each disclose an automated control system for a Claus sulfur plant. The flow rate of the oxygen-containing gas to a process for the oxidation of hydrogen sulfide in U.S. Pat. No. 3,985,864 is regulated so as to be responsive to changes in pressure in the hydrogen sulfide feedstream. In both patents, the overall ratios of oxygen to hydrogen sulfide are adjusted to maintain the desired ratio of hydrogen sulfide to oxygen feed. In carrying out stoichiometric control of the hydrogen sulfide gas stream and oxygen-containing gas stream, there are five objectives cited in U.S. Pat. No. 3,985,864. These objectives are (1) maintain the quantity of oxygen below that stoichiometrically required for the oxidation of the hydrogen sulfide in order to prevent the formation of sulfates; (2) maintain the oxygen quantity as close as possible to the stoichiometry required in order to promote the highest possible efficiency of oxidizing the hydrogen sulfide-containing gas stream and to reduce the sulfur content of the gaseous effluent from the process; (3) maintain stable control of the process while achieving the above two objectives, even though the gas flow may vary; (4) maintain stable control, even though the hydrogen sulfide content of the hydrogen sulfide gas-containing stream may vary; and (5) effect stable control of the process while achieving the above four objectives, even though there is a time between the occurrence of a variation in one or both of the process feed-streams and the occurrence of the measurement of the affect of that variation on the gaseous effluent from the process. In summary, both patents disclose an automated flow control scheme to maintain the required stoichiometry of the Claus reaction.

A Claus sulfur plant throughout this specification is intended to mean a plant for converting hydrogen sulfide alone or in combination with fixed nitrogen, e.g. ammonia, to produce sulfur. U.S. Pat. No. 3,970,743 (1976) of D. K. Beavon, which is expressly incorporated herein in its entirety, along with references cited therein, discloses a process for the production of sulfur from mixtures of hydrogen sulfide and fixed nitrogen compounds. While this patent discloses the desirability of running the initial reaction zone of a Claus thermal reactor in an oxygen-lean state, there is no temperature control strategy to optimize overall performance of such a reactor.

Attempts to control temperature in the first zone by an automatic method for varying the fraction of predominantly hydrogen sulfide-containing gas introduced into the first zone which only follows temperature will likely have problems and fail to control temperature properly. This is likely because the same temperature in the first zone can be obtained at two different relative amounts of sulfur-containing reactants. For example, if the first zone were in an "oxygen-rich" condition, then a decrease in sulfur-containing reactants will lead to a decrease in temperature in the first reaction zone; but, if the first zone were in an oxygen-lean condition, then the decrease in sulfur-containing reactants will lead to an increase in temperature in the first reaction zone. In summary, the relative concentrations of the sulfur-containing reactants to molecular oxygen-containing reactants must be known before a "simple automated instruction" to a control valve controlling the flow of the sulfur-containing reactants can be defined. By "simple automated instruction" is meant a command to open or close a particular valve by some incrementally desired amount.

It is, therefore, a principal object of this invention to provide a unique temperature control strategy and method for carrying out the Claus reaction which optimizes overall performance of a Claus sulfur plant.

It is an object of this invention to provide a unique method for controlling the temperature in the first of two interconnected thermal reaction zones of a Claus thermal reactor, wherein the first zone is more upstream than the second.

Other objects of this invention are clear based upon this specification.

BRIEF DESCRIPTION OF THE INVENTION

Broadly, this invention involves controlling the relative amounts of sulfur-containing reactants to molecular oxygen-containing reactants within the following constraints: (i) the appropriate stoichiometry for the Claus reaction is satisfied, (ii) an oxygen-lean condition is preferably maintained in the first reaction zone, and (iii) the temperature in the first of two interconnected thermal reaction zones is kept within a desired range.

In one embodiment of this invention is a sulfur plant for converting hydrogen sulfide into water and elemental sulfur involving two successive reaction zones. The first of these two reaction zones is adapted to receive a hydrogen sulfide-containing stream and a molecular oxygen-containing stream. The second of these two reaction zones is adapted to receive a product stream from the first reaction zone and a hydrogen sulfide-containing stream. The hydrogen sulfide-containing stream entering the second reaction zone may be a part of the stream that would otherwise enter the first reaction zone or it may be an entirely separate and distinct stream unaffected and in no way interacting with that hydrogen sulfide-containing stream which enters the first reaction zone. In the first reaction zone, the hydrogen sulfide-containing stream entering therein is contacted with the molecular oxygen-containing stream at conditions sufficient to oxidize at least a portion of the hydrogen sulfide present to form a reaction product stream containing sulfur dioxide. In the second reaction zone, the product stream is contacted with a hydrogen sulfide-containing stream which enters therein at conditions sufficient to form a second reaction product stream containing water and elemental sulfur. The second reaction product stream may be then further processed in separate, but additional, reaction zones to do at least one of the following: separate out the elemental sulfur produced; and, further, react any oxygen-containing compounds and any hydrogen sulfide present to produce additional elemental sulfur and water.

In addition to the two successive reaction zones described above, there is a first means for measuring the amount of hydrogen sulfide entering the first reaction zone and for transmitting the information to a third means to be described in more detail hereinafter. The process of transmitting information involves transmitting of a hydrogen sulfide-amount signal representative of or indicative of the amount of hydrogen sulfide present in the stream entering the first reaction zone. An example of a device suitable for use as a first means is a flow measuring device. The flow measuring device is capable of measuring the amount of flow of the hydrogen sulfide-containing stream. A separate determination of the percent by volume or by weight of any hydrogen sulfide component in that stream can be used to calculate the actual amount by moles or by weight of hydrogen sulfide that is being carried into the first reaction zone.

In addition to the above, there is a second means for measuring the amount of molecular oxygen which during operation would enter the first reaction zone and for transmitting to the third means (to be described in more detail hereinafter) a molecular oxygen-amount signal indicative of the amount of molecular oxygen present. A device similar to that described with respect to the first means can be used with respect to this second means.

In addition, the third means mentioned above is a means for comparing the hydrogen sulfide-amount signal and the molecular oxygen-amount signal described hereinabove, and for transmitting to a fifth means (to be described in more detail hereinafter) a comparison signal dependent, at least in part, upon the hydrogen sulfide-amount and the molecular oxygen-amount signal.

For example, the hydrogen sulfide-amount signal and the molecular oxygen-amount signal could initially be in terms of a flow measurement as transmitted from the first and second means to the third means, but then, in the third means, the flow measurement is converted into, for example, moles of hydrogen sulfide and moles of molecular oxygen, respectively. The third means then compares the number of moles of hydrogen sulfide and the number of moles of oxygen entering the first reaction zone. In order to maintain the first zone in an oxygen-deficient or oxygen-lean condition, the ratio in moles of oxygen to hydrogen sulfide must be less than 3 to 2 as dictated by reaction (1) of FIG. 1. When the ratio in moles of oxygen to hydrogen sulfide is greater than 3 to 2, then the reaction zone has an excess of oxygen and is in an oxygen-rich condition.

In addition to the above, there is a fourth means for determining temperature within the first reaction zone and for transmitting a temperature signal indicative of that temperature to a fifth means (to be described in more detail hereinafter). Due to the corrosive atmosphere and high temperatures present in the first reaction zone of a sulfur plant, it is preferable that photometric methods be employed which avoid the problems from direct-contact measurement, such as would be used in the case of a thermalcouple. It has been found that it is particularly useful to use photometric determinations of temperature in the first reaction zone. It has further been found that sufficiently accurate temperature determinations can be made by means of photometric measurements in the first reaction zone to obtain useful benefits.

In addition to the above, there is a fifth means, which is a means for varying the temperature by varying the relative amount of hydrogen sulfide to molecular oxygen which during operation enters the first reaction zone. The fifth means, in addition to being able to vary the relative amounts of hydrogen sulfide to molecular oxygen, must also be responsive both to the temperature signal transmittible by the fourth means for determining temperature and to the relative amount of molecular oxygen to hydrogen sulfide present in the first reaction zone.

For an example of the temperature control strategy of this invention, assume that the first reaction zone is in an oxygen-rich condition and the temperature is higher than that desired for the first reaction zone, then one method for varying the relative amount of molecular oxygen to hydrogen sulfide so as to lower the temperature is to decrease the amount of hydrogen sulfide to the first reaction zone without changing the amount of molecular oxygen entering the first reaction zone. In a preferred embodiment of this invention, the amount of hydrogen sulfide then used in the second reaction zone, which enters directly into the second reaction zone, is increased appropriately, so that the overall total amount of hydrogen sulfide entering either the first reaction zone or the second reaction zone stays the same and satisfies the Claus reaction stoichiometry.

For another example of the temperature control strategy of this invention, assume that the total amount of oxygen entering the first reaction zone is kept substantially constant, the first reaction zone is in an oxygen-lean condition, and the temperature is too high and it is desired that it be lowered, then the amount of hydrogen sulfide entering the first reaction zone is increased and the amount of hydrogen sulfide entering the second reaction zone directly is decreased, so that the total amount of hydrogen sulfide entering both the first and second reaction zones remains unchanged, whereby the temperature in the first reaction zone will decrease. Were the first zone in an oxygen-rich condition, then the amount of hydrogen sulfide entering the first reaction zone would be decreased and the amount entering the second zone appropriately increased in order to lower the temperature in the first zone. In the preferred operation of a sulfur plant, the flow of molecular oxygen to the first reaction zone is preferably maintained substantially constant with only minor changes therein.

This invention may also include additional processing of the reaction product stream produced in the second reaction zone. It is not uncommon in the art to further equilibrate the amount of water and sulfur in the product stream produced in the second reaction zone. Several catalysts well known in the art are employed to achieve this equilibration. Further, after having gone through perhaps more than one additional processing reaction zone for converting sulfur oxides into elemental sulfur and water, it is not uncommon to determine the ratio of sulfur dioxide to hydrogen sulfide present after the above additional processing steps have been carried out. This determination of the amount of $SO_2$ to hydrogen sulfide can then be used to readjust the rates at which molecular oxygen-containing streams and hydrogen sulfide-containing streams are introduced; the intent being that the ratio of sulfur dioxide to hydrogen sulfide be in a ratio of about two moles of hydrogen sulfide for each mole of sulfur dioxide.

In summary, the reaction control strategy employed in the sulfur plant of this invention involves the possibility of two types of process control: one involving stoichiometry and the other involving temperature. The essential feature novel in this invention is that temperature in the first reaction zone of the plural zone sulfur plant is controlled by varying the relative amount of molecular oxygen to molecular hydrogen sulfide in the first reaction zone consistent with the Claus reaction stoichiometry.

As is well known in the refinery process art, there are at least two sulfur-containing process streams produced in refinery operations. These are an amine acid gas stream containing approximately 95 percent hydrogen sulfide and a sour water stripper (SWS) gas stream containing approximately equal molar amounts of ammonia ($NH_3$), hydrogen sulfide ($H_2S$), and water.

The SWS gas stream arises when water comes into contact with some hydrocarbon stream during some hydrocarbon processing step carried out in a refinery. Examples of such steps in a refinery are:

1. Condensation of water in a crude column overhead which contains $NH_3$ and $H_2S$.
2. Contact of $NH_3$ and $H_2S$ with condensing steam used as a motive operator to generate a vacuum in a vacuum distillation column.
3. Injection of water in a hydrodesulfurization unit to contact with an $NH_3$ containing hydrocarbon stream to remove the $NH_3$ from the hydrocarbon stream.

Figure 3:
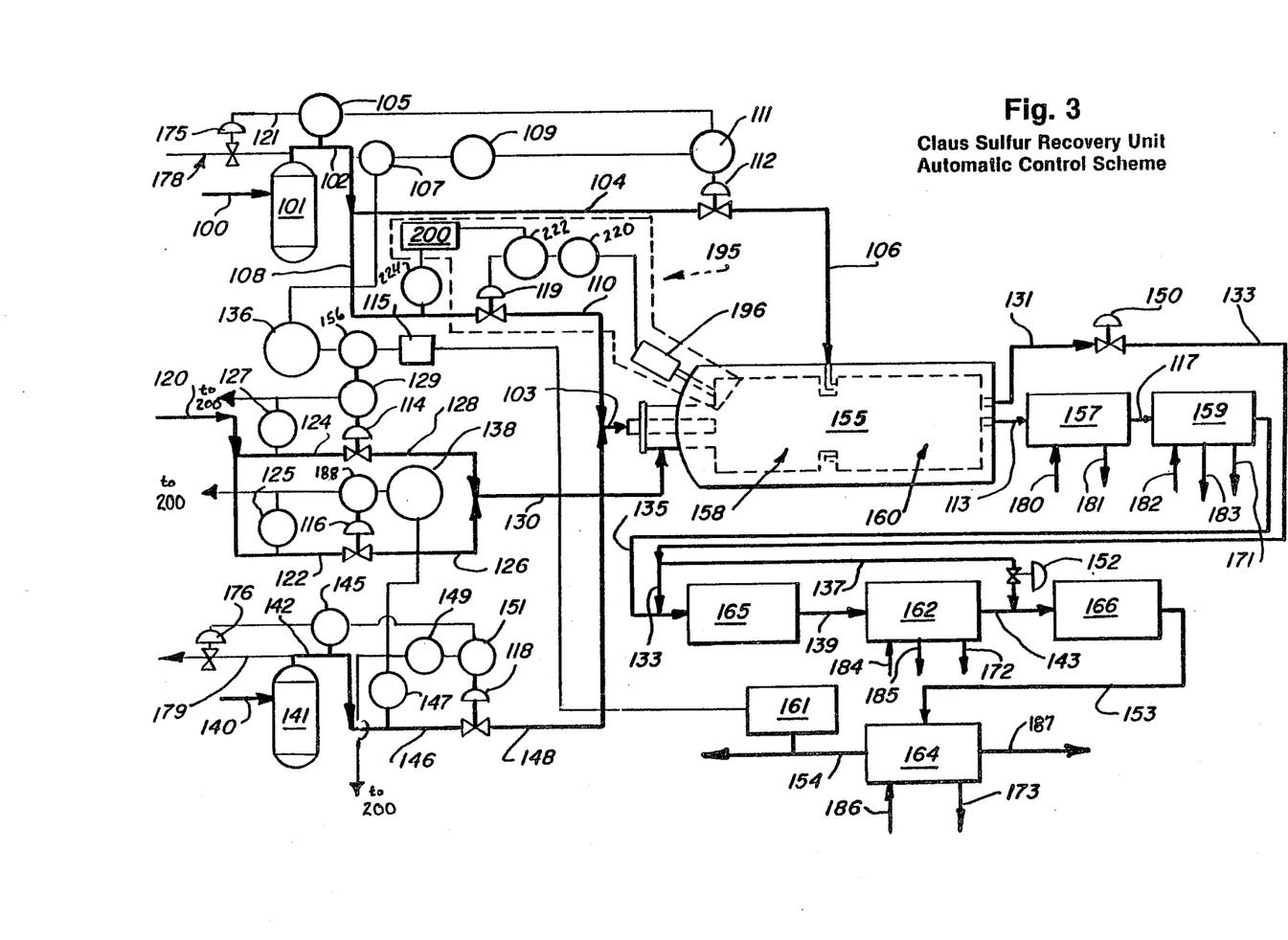
FIG. 3 is a schematic view of a Claus sulfur recovery unit having automatic flow controls.

These streams of water are combined and fractionated in a SWS stripper to produce a gas which is cooled and then processed through a knock-out pot shown as vessel 141 in FIG. 3.

The amine acid gas stream arises from contacting in a counter-current reactor or contactor a stream of $H_2S$ gas flowing in one direction with an alkyl amine stream flowing in the opposite direction. An example of this process is the Shell sulfinol process discussed in Modern Petroleum Technology (1975) edited by Hobson and Pohl. The amine acid adduct produced is fractionated so that the amine acid adduct is broken into an amine stream and a stream commonly referred to as the amine acid stream containing about 95 percent or more hydrogen sulfide gas. The amine acid gas stream is cooled and processed through vessel 101 shown in FIG. 3.

DETAILED DESCRIPTION OF THE INVENTION

Figure 1:
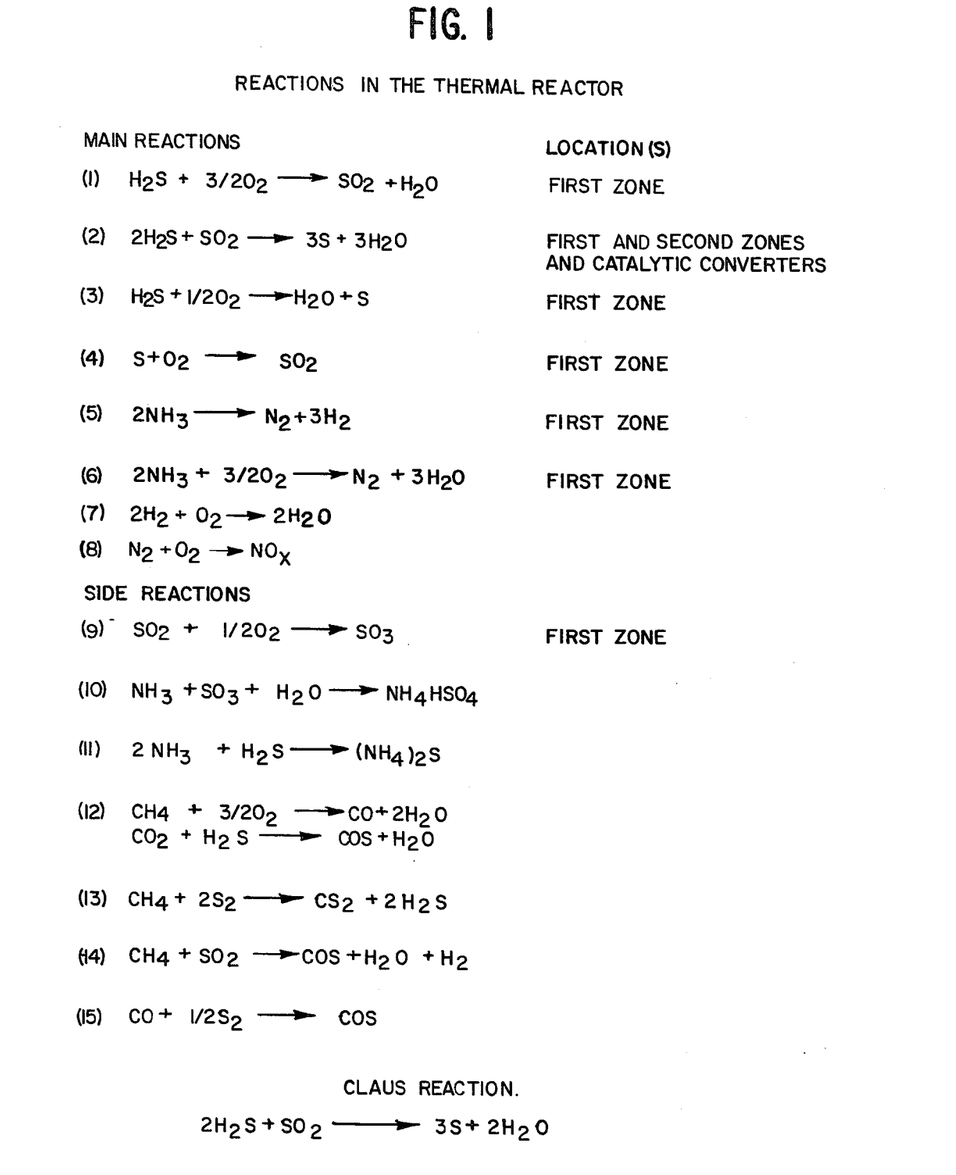
FIG. 1 sets forth the Claus reaction and various chemical reactions taking place in various locations of a Claus sulfur plant.
Figure 2:
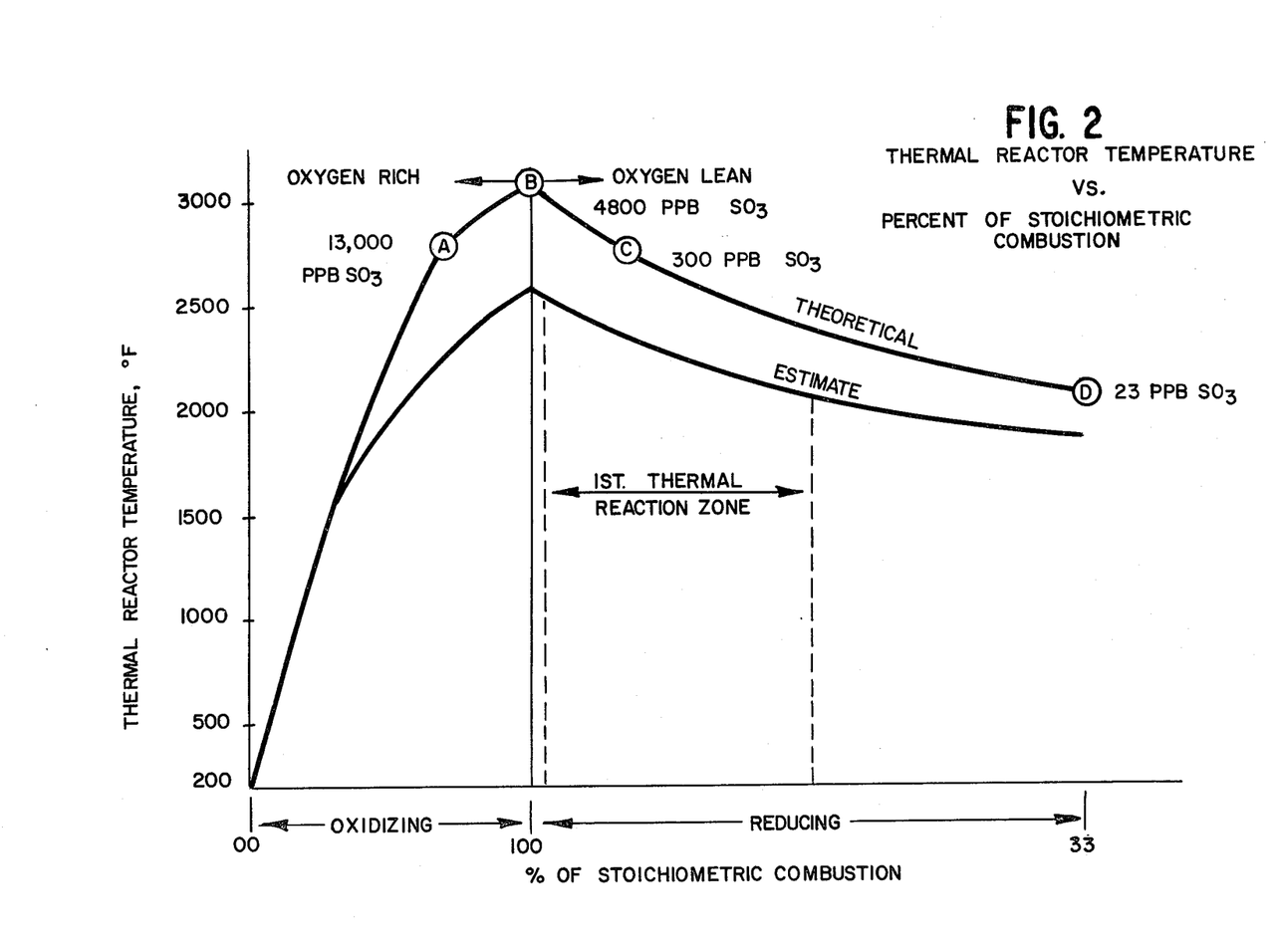
FIG. 2 is a plot of both the theoretical and estimated temperature profile of the first zone of thermal reactor 155 shown in FIG. 3. The estimate is lower due to thermal losses which cannot be precisely determined except empirically.

FIGS. 1 and 2 will be referred to in conjunction with discussions of FIG. 3 given hereinafter.

FIG. 3 discloses the following items: Two storage containers or liquid knock-out vessels 101 and 141, a thermal reactor 155 having a first zone 158 and a second zone 160, a heat exchanger 157, flow measuring controls 107, 125, 127, 147 and 224s flow indicating controls 109, 129, 149 and 188, an analyzer 161 for $SO_2$ and $H_2S$, a computer 200, a signal comparator 222, a first, second and third sulfur separation vessel respectively numbered 159, 162 and 164, a first and second catalytic converter respectively numbered 165 and 166, conduits for transfer of either solids, liquids or gases numbered 100, 102, 103, 104, 106, 108, 110, 113, 117, 120, 122, 124, 126, 128, 130, 131, 133, 135, 137, 139, 140, 142, 143, 146, 148, 153, 154, 171, 172, 173, 180, 181, 182, 183, 184, 185, 186, and 187, electrical connection 121, switch 111, 151, and 156 valves 112, 118, 119, 152, 175, and 176, pressure indicating controls 105 and 145, ratio control valves 136 and 138, temperature indicating control 220, and a thermal detector 196.

Electrical connections such as electrical connection 121 are distinquishable from conduits carrying either liquids or gases such as conduit 100 by being thinner and somewhat lighter.

An example of a commercially available flow indicating controller such as controllers 107, 129, 149 and 188 useful in this invention is Honeywell, Inc. TDC-2000 system. An example of a commercially available analyzer 161 for $SO_2$ and $H_2S$ useful in this invention is E.I. Dupont de Nemours Company Model 462 Analyzer. An example of a commercially available computer 200 useful in this invention is a Model 4500 computer system sold by Honeywell, Inc. An example of a commercially available pressure indicating controller such as controllers 105 and 145 useful in this invention is Honeywell, Inc. TDC-2000 system. An example of a commercially available temperature indicating controller 220 useful in this invention is Honeywell TDC-2000 system. Examples of a commercially available thermal detector 196 useful in this invention are Pulsar II, Model 7000 SR-102, IR detector sold by $E^2$ Technology, Ventura, Calif. or an 886 Lens Spectray Temperature Detector sold by Leeds and Northrup.

To understand the operation of the Claus sulfur recovery unit shown in FIG. 3, both (1) the flow path of each stream and (2) the control mechanisms over the quantity of material flowing along each path relative to other paths and other streams will be discussed hereinafter in more detail.

There are three feedstreams consisting of a sour water stripped stream, an amine acid gas stream and an air stream. The sour water stripped stream consists of approximately equal molar quantities of ammonia, hydrogen sulfide and water. The amine acid gas stream consists of in excess of 95 percent hydrogen sulfide gas. The oxygen-containing stream, usually at a pressure of about 10 PSIG, contains about 21 percent oxygen. Considering each stream separately, the amine gas stream, after entering through conduit 100 into knock-out vessel 101, is transferred to thermal rector 155. The amine acid stream from vessel 101 carried by conduit 102 is split into two streams, the first of which enters the first zone 158 of thermal reactor 155 serially through conduits 108, 110 and 103, and the second of which enters the second zone 160 of thermal reactor 155 serially through conduits 102, 104 and 106. Compressed air through conduit 120 enters only the first zone 158 of thermal reactor 155 in two parallel streams, the first of which is carried serially through conduits 124, 128 and 130, and the second of which is carried serially through conduits 120, 122, 126 and 130. Sour water stripped gas entering through conduit 140 into storage vessel 141 is transferred only to the first zone 158 of thermal reactor 155.

The control mechanisms over the quantity of material flowing along each path relative to other flow paths and other streams will now be discussed in more detail hereinafter.

The first flow path to be discussed is the amine acid gas stream which enters through conduit 100 into knock-out vessel 101. The pressure within knock-out vessel 101 is measured by pressure indicating control 105. If the pressure within vessel 101, as measured in conduit 102 by pressure indicating control 105, is above a certain desired value, e.g. 10 psig, then a signal through an electrical conduit 121 is sent by the pressure indicating control 105 to control valve 175 along electrical conduit 121. Control valve 175 then opens or closes in response to the signal sent by pressure indicating control 105. Valve 175 controls the flow of amine acid gas through conduit 178. By controlling the amount of amine acid gas flowing through conduit 178, the pressure within conduit 102 can be maintained at some desired value. The gas exiting through conduit 178 can be sent either to another sulfur plant for processing or to a flare for venting from the system.

Also attached to conduit 102 is a flow measuring device 107. Flow measuring device 107 measures the total flow of amine acid gas from knock-out container 101 into thermal reactor 155. Flow indicating control 109 receives information from flow measuring control 107 and transmits the information to switch 111. Valve 112 is in turn responsive to a signal transmitted from Switch 111 so as to open or close. Switch 111 can transmit one of at least two different signals: one which is indicative of flow and the other indicative of pressure. The amine acid gas flowing past flow measuring control 107 is divided into two streams which enter conduits 104 and 108. A first stream flows through conduit 104 through valve 112 into conduit 106 and then into the second zone 160 of thermal reactor 155. A second stream of the amine acid gas flows through conduit 102 into conduit 108 past valve 119 into conduit 110, which then leads into the first zone 158 of thermal reactor 155. Ignoring the control mechanism for valve 119, the relative amount of amine acid gas entering the first zone 158 as compared to the second zone 160 of flow reactor 155 will be determined by the amount valve 112 is open or closed. Valves 112 and 119 provide a method for regulating the relative amount of amine acid gas entering the first zone versus the second zone of thermal reactor 155.

The sour water stripped gas entering through conduit 140 into storage vessel 141 is regulated to have a pressure in the range of about 5 to about 20 psig by means of pressure indicating control 145. Attached to conduit 142 is a conduit 179 containing a control valve 176. Control valve 176 is, in turn, controlled by pressure indicating control 145 so as to open or close in response to the amount of the pressure in vessel 141. In summary, a pressure release system consisting of conduit 179, valve 176 and pressure indicating control 145 provides a method for controlling the overall pressure of sour water stripped gas in knock-out vessel 141. This pressure relief system operates in substantially the same manner as the pressure release system discussed with respect to the amine acid gas knock-out vessel 101. The sour water stripped gas not exiting through conduit 179 is transferred through conduits 142, 146 and 148 into conduit 103, which enters the first zone 158 of thermal reactor 155. All of the sour water stripped acid gas from vessel 141 enters the first zone 158 of thermal reactor 155 in order to assure that all of the ammonia present in the sour water stripped gas is converted to nitrogen gas or $NO_x$ containing species in accordance with reactions 5 and 8 shown in FIG. 1. The amount of sour water stripped gas flowing into the first zone 158 of thermal reactor 155 is measured by flow measuring control 147. The amount of material shown by flow indicating control 149 determines a signal which is transmitted to switch 151. Valve 118 is in turn responsive to a signal transmitted from Switch 151 so as to open or close. Switch 151 functions in substantially the same way that Switch 111 functions.

Not discussed up to this point is the relative amount of amine acid gas and sour water stripped gas entering thermal reactor 155, as compared to compressed air entering through conduit 120. Broadly, the relative amount of air entering conduit 120 to the amounts of gas entering conduits 142, 148 and 103 is adjusted so that for each two moles of hydrogen sulfide there is one mole of oxygen regardless of other species which like ammonia will prevent some oxygen from reacting with the hydrogen sulfide. There are many control systems which can be used to establish the stoichiometry of the reaction for forming sulfur and water. One method that is being used in the example shown in FIG. 3 is to separately control the amount of air relative to the amine acid gas, on the one hand, and the sour water stripped gas on the other. The relative amounts of air versus these two different sources for hydrogen sulfide gas are dertermined by the ratio control valves 136 and 138, respectively. Considering the relative amount of air passing through conduits 120, 124, 128, 130 and 103 versus the amount of hydrogen sulfide passing through conduit 102, it is clear that the composition of amine acid gas in knock-out vessel 101 must be known or determined along with pressure and flow. Knowing the composition of the amine acid gas in knock-out vessel 101, its pressure and its flow past flow measuring device 107, one can adjust, by means of a signal from flow measuring control 107 into ratio control valve 136 followed by transmission to switch 156 determine by how much control valve 114 is opened or closed by flow indicating control 129 to assure that the ratio in moles of $H_2S$ gas entering from knock-out vessel 101, compared to the amount of oxygen entering from conduit 120, into conduits 124 and 128 is about two moles of $H_2S$ per each mole of oxygen.

Similarly, ratio control valve 138 compares the amount of flow of sour water stripped gas past flow measuring control 147, which is in conduit 146 and compares the amount of $H_2S$ being carried by conduit 146 to the amount of oxygen flowing in conduit 122, as measured by flow measuring control 125. In order that the ratio of the number of moles of $H_2S$ flowing in conduit 146 to the moles of oxygen flowing through conduit 122 are in a ratio of about two moles of $H_2S$ per each mole of oxygen, the ratio control valve 138 adjusts the flow indicating control 188, which in turn opens or closes valve 116 appropriately. Since not only hydrogen sulfide-containing species will react with molecular oxygen, but also fixed nitrogen-containing compounds such as ammonia, some additional oxygen is added so that the ratio of available molecular oxygen to hydrogen sulfide is in a ratio in moles of approximately 2 to 1. Sufficient oxygen to react with fixed-nitrogen containing species is an important part of preferred operation of the sulfur plant of this invention.

Ratio controllers 136 and 138, along with valves 112, 114 and 116, control the flow of the various streams into the first or second zones of thermal reactor 155 by feedforward control signals which anticipate reactions to take place in the first and second zones of reactor 155.

In order to fine tune the reactions occurring in thermal reactor 155 and in the various catalytic converter zones 165 and 166, an $H_2S$ and $SO_2$ analyzer 161 is used to determine the relative amounts of $H_2S$ and $SO_2$ contained in conduit 154. The ratio in moles of $H_2S$ to $SO_2$ should be about two to one in order to satisfy the stoichiometry of a Claus reaction.

The ratio of $H_2S$ to $SO_2$ in moles determined by analyzer 161 is transmitted by electrical conduits to a comparator 115, which compares the ratio determined by analyzer 161 to the desired ratio of two to one which is necessary to satisfy the Claus reaction. This information is then transmitted to fluid indicating control 129 via switch 156, which adjusts valve 114 accordingly. That is, valve 114 is opened if the ratio is greater than two to one, because this indicates that there is an insufficient amount of oxygen present, and it is closed if the ratio is less than two to one, an excess amount of oxygen being otherwise present. The control system involving analyzer 161 is a feed-back control system. It must be adjusted so that information determined by the analyzer is utilized and then updated to determine the effectiveness of the feed-back control signal which fine tunes the Claus sulfur recovery unit consistent with residence times of reactants within the Claus sulfur recovery unit.

The analyzer 161 is a fine tuning component to the system which further refines the reactions occurring in the first and second zones of thermal reactor 155, along with the equilibrating Claus reactions occurring in zones 165 and 166. This fine tuning is required because of the presence of side reactions such as 11, 12 and 14 shown in FIG. 1.

To understand the reactions occurring in the Claus sulfur recovery unit, the process streams entering and issuing from thermal reactor 155 will now be discussed. Ammonia, water and hydrogen sulfide gas enter the first zone 158 of thermal reactor 155 through conduit 103. Also entering first zone 158 of thermal reactor 155 through conduit 130 is the stream of oxygen. The oxygen content of the first zone is considered oxygen-lean, in view of the following reactions numbered 1, 2, 3, 4, 7 and 8 shown in FIG. 1. It is preferred that the first reaction zone be run in an oxygen-lean condition so as to minimize the production of $SO_3$. In FIG. 2, at circled points A, B, C and D, there is given the amount of $SO_3$ in parts per billion (PPB). On the reducing side of the 100% of stoichiometric combustion, with decreasing temperatures, there is a decrease of $SO_3$ from approximately 4800 PPB at point B to approximately 23 PPB at Point D.

It is also desirable to keep the temperature in the first zone 158 below about 2600° F. so as to avoid damage to the refractory lining of thermal reactor 155, which is shown in more detail in FIG. 4.

The material exiting first zone 158 enters second zone 160 along with amine acid gas which enters thermal reactor 155 through conduit 106. It is desirable to have a good deal of mixing of the various reactive gas streams so as to cause as complete a reaction as possible.

The gases exiting from second zone 160 through two conduits, 131 and 113. Conduit 113 really is a plurality of conduits 190 shown in FIG. 4. Heat exchanger 157, employing water as the heat exchange medium, is really attached to second zone of thermal reactor 155, as shown in more detail in FIG. 4. Heat exchanger 157 consists of inlet conduit 180 for water and outlet conduit 181 for steam. Free volume 174 within heat exchanger 157 shown in FIG. 4 provides contact pathways for water and steam to contact conduits 190. The steam exiting through conduit 181 can be used in other refinery operations where heating is desired.

Figure 4:
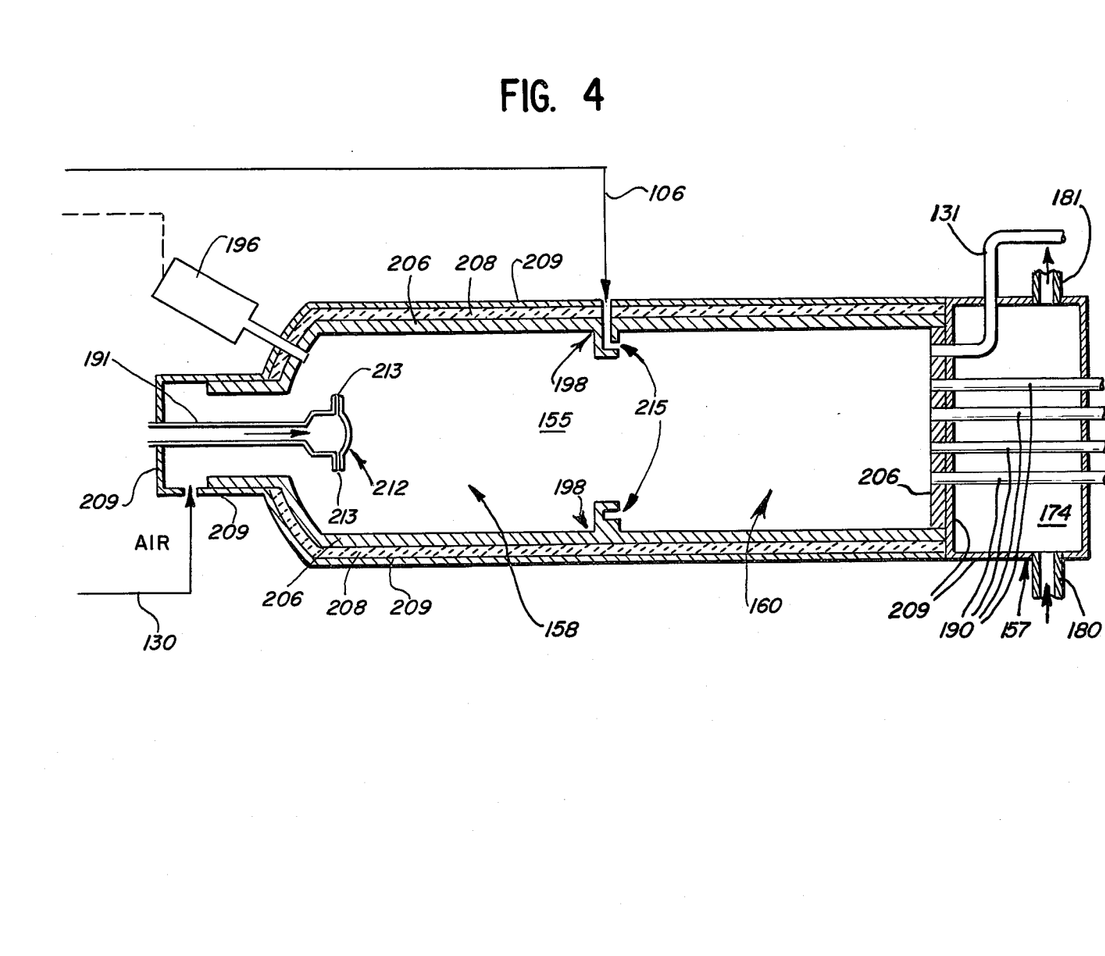
FIG. 4 is a side elevation view in cross section of the thermal reactor 155 of FIG. 3.

Conduit 117 is really an extension of conduit 113 which, as was discussed earlier, can be a plurality of conduits shown as conduits 190 in FIG. 4. Sulfur separation vessel 159 has an inlet 182 for water and an outlet conduit 183 for heated water or steam. The water passing through vessel 159 further cools the hot gases exiting from heat exchanger 157. A take-off conduit 171, which ties into conduit 117, permits the removal of condensed sulfur as a liquid. The uncondensed materials exiting vessel 159 are transferred by conduit 135 to a first catalytic converter 165. A second conduit 133 shown as a takeoff conduit from second zone 160 of thermal reactor 155 contains a material not cooled as much as the other materials exiting the second zone. The material in conduit 133 can be used to heat by direct contact materials in conduit 135. An alternative way for heating material in conduit 135 is to use a heat exchanger which uses some of the steam contained in conduit 181 to heat material in conduit 135. Use of steam such as in conduit 181 as a heat exchange medium is the preferred method for heating.

First converter 165 uses a catalyst such as bauxite, or activated alumina, to catalyze reaction between $H_2S$ and $SO_2$ to form sulfur and water. In essence, first converter 165 is a catalytic converter to carry out the Claus reaction. The material exiting from first converter 165 is transferred through conduit 139 to a second separation vessel 162, which is much like vessel 159. Water enters conduit 184 and steam or heated water exits conduit 185. Conduit 172 tied into conduit 139 removes liquid sulfur which has formed as a result of cooling by heat exchange with water. The uncondensed material exiting second vessel 162 transferred by conduit 143 is heated by the addition of material, for example, carried by conduit 137. The amount of material mixed into contact within the material within conduit 143 from conduit 137 is controlled by valve 152. Reheated material carried by conduit 143 enters a second catalytic converter 166, much like catalytic converter 165, also containing a catalyst such as bauxite which catalyzes further reaction of $H_2S$ plus $SO_2$ to form sulfur and water. The materials exit from second converter 166 in conduit 153, where they are cooled by heat exchange in third vessel 164 with water entering conduit 186 and existing conduit 187. Condensed sulfur as in vessels 159 and 162 exits third vessel 164 through conduit 173.

Uncondensed gases exit third vessel 164 in conduit 154 and are analyzed for the ratio of $H_2S$ to $SO_2$ by an analyzer 161.

Of critical importance, and a key feature unique to the Claus sulfur recovery unit shown in FIG. 3, is a feed-back control system highlighted in a dotted area identified as 195. The control system indicated in the dotted area 195 is a feedback control system capable of controlling the temperature of first zone 158 of thermal reactor 155 by controlling the amount of amine gas entering the first zone relative to the amount entering the second zone of thermal reactor 155.

Thermal detector 196 focuses on light radiation emitted in first zone 158. Detector 196 produces a signal proportional to the intensity of the radiation detected. The signal is a measure of the temperature of first zone 158. This temperature signal then goes to a temperature indicating control 220, which in turn transmits this information to a signal comparator 222, which controls valve 119 so as to increase or decrease the amount of amine acid gas entering the first zone 158, as compared to second zone 160 of thermal reactor 155. However, before information from the temperature indicating control can be used to determine which direction to turn valve 119, i.e. to a more open or less open position in response to an indication of temperature, it is necessary to determine whether a reaction in the first zone is in an oxygen-lean or an oxygen-rich condition.

Referring to FIG. 2, it is clear that, if the amount of oxygen entering the first reaction zone 158 is substantially constant and if that zone is in an oxygen-lean condition, then a reduction in the amount of amine acid gas to the first reaction zone will result in an increase in temperature. If, on the other hand, the first reaction zone is in an oxygen-rich condition and all other conditions are the same, then a reduction in the amount of amine acid gas entering first zone 158 results in a decreased temperature. Consequently, the temperature indicating control requires additional information to decide in which direction to turn valve 119 in order to either increase or decrease the temperature. This information as to which direction to turn valve 119 is supplied by Computer 200. To computer 200, there is transmitted flow rate information for each stream entering first zone 158 of reactor 155 from the following flow measuring devices: flow measuring control 224 (for the amine acid stream); flow measuring controls 125 and 127 (for two oxygen-containing streams); and flow measuring control 147 (for the SWS stream). The concentration of each reactive species within each stream cited above is also provided to the computer so as to permit the calculation of the relative concentrations of all oxidizing and reducing species present in the first zone 158 of the thermal reactor 155. For example, the percent by weight of ammonia or hydrogen sulfide plus the total weight of gas flowing into reactor 155 permits the properly programmed computer to calculate the total weight of ammonia or hydrogen sulfide entering reactor 155. The percent by weight information on each reactive species of each stream can be determined continuously by automated analytical equipment known in the art and transmitted to computer 200. Frequent determinations are not usually required, since the percent by weight of each species is generally relatively constant over a long period of time. Analytical determinations are, therefore, done only so frequently as necessary to keep an accurate measure of the concentrations of each reactive species in each stream. Computer 200 takes information relating to the amount of amine acid gas and sour water stripped gas entering the first zone, in comparison with the amount of oxygen entering the first zone, to determine whether the first zone is in an oxygen-rich or in an oxygen-lean condition. Once the temperature indicating control has been told whether the first zone is in an oxygen-rich or an oxygen-lean condition, and once the temperature indicating control has been calibrated for the conditions in the first zone, then the direction that valve 119 should be turned is established in order to increase or decrease the temperature.

Referring to FIG. 4, there is disclosed an enlarged cross-section view of reactor 155, a spectroscopic thermal detector 196, conduits 106, 130, 131, 180, 181, 190 and 191, inlets 213 of distribution head 212, inlets 215, obstructions 198 and a condensor heat exchanger 157.

The walls of reactor 155 are layered. Beginning from within reactor 155 and working outward, the layers are as follows: firebrick 206, castable refractory 208 and carbon steel shell 209. Gases enter reactor 155 through conduits 106, 130 and 191. At one end of conduit 191 is a distribution head 212 having openings 213. The openings 213 are intended to cause sulfur and ammonia-containing gases to mix with air entering through conduit 130 for optimal reaction in first zone 158. Obstructions 198 around the periphery of reactor 155 prevent wall effects from interfering with reactions. The obstructions 198 cause the reactants to move from the outer walls toward the central axis of reactor 155. Ports 215 in obstructions 198 are connected to conduit 106 to permit entrance of amine acid gas containing in excess of 95 percent hydrogen sulfide gas and, preferably, no nitrogen containing species.

The thermal detector 196 found especially useful for this invention works by focusing on radiant energy produced in the first zone 158 of reactor 155. Focusing on the firebrick 206 permits the detection of a range of frequencies indicative of the temperature at the surface of the firebrick 206. The intensity of one or more frequencies having an effective wave length in the range of about 0.3 to about 10 microns, preferably about 0.3 to about 7, provides the information necessary to determine temperature. Note that the intensity observed for any one frequency is not linearly related to temperature, but is in a fourth order relationship to temperature consistent with a corrected Stefan-Boltzmann distribution.

After reaction in the second zone 198, gases are removed through several conduits 190 and, optionally, 131. Conduits 190 correspond to conduit 113 schematically represented in FIG. 3.

Heat exchanger 157, shown as a separate block in FIG. 3, is preferably directly attached to reactor 155 as shown in FIG. 4. Space within heat exchanger 157 provides a zone 174 wherein water entering through conduit 180 contacts conduits 190 resulting in a transfer of heat from the materials within conduits 190 to the water and wherein the steam produced during the above heat exchange exits through conduit 181.

Specific embodiments of this invention discussed throughout this Specification, and especially with respect to the drawings, are intended to be illustrative only. Variations on these specific embodiments are clear to one of skill in the art based upon this Specification and are intended to be part of this invention.

The invention which is claimed is:

1. A sulfur plant for converting hydrogen sulfide into water and elemental sulfur comprising:

at least two successive reaction zones, which are a first reactor zone adapted to receive a first hydrogen sulfide-containing stream and a molecular oxygen-containing stream and a second reaction zone adapted to receive a first reaction product stream from said first zone and a second hydrogen sulfide-containing stream, where in said first reaction zone said first hydrogen sulfide-containing stream is contacted during operation with said molecular oxygen containing stream at conditions sufficient to oxidize hydrogen sulfide to form said first reaction product stream containing sulfur dioxide, which is a reaction product of at least a portion of hydrogen sulfide in said hydrogen sulfide-containing stream and molecular oxygen in said molecular oxygen-containing stream, and where in said second zone, said first reaction product stream is contacted with a second hydrogen sulfide-containing stream at conditions sufficient to form a second reaction product stream containing water and elemental sufur made from at least a portion of said second hydrogen sulfide-containing stream and said first reaction product stream;

a first means for measuring amount of hydrogen sulfide in said first hydrogen sulfide-containing stream which during operation would enter said first reaction zone and transmitting to a third means a hydrogen sulfide-amount signal indicative of said amount of said hydrogen sulfide;

a second means for measuring amount of molecular oxygen which during operation would enter said first reaction zone and transmitting to said third means a molecular oxygen-amount signal indicative of said amount of said molecular oxygen;

a said third means for comparing said hydrogen sulfide-amount signal and said molecular oxygen-amount signal and for transmitting to a fifth means a comparison signal dependent, at least in part, upon both said hydrogen sulfide-amount signal and said molecular oxygen-amount signal;

a fourth means for determining temperature within said first reaction zone and for transmitting a temperature signal indicative of said temperature to said fifth means;

a said fifth means for varying relative amount of hydrogen sulfide to molecular oxygen which during operation would enter said first reaction zone in response to two signals: said temperature signal and said comparison signal; whereby a temperature control strategy can be followed to maintain temperature in the first reaction zone to some desired value.

2. In the sulfur plant of claim 1, wherein:

said first means is a first flow measuring device for measuring during operation flow of said hydrogen sulfide-containing stream into said first zone and for transmitting said molecular oxygen-amount signal to said third means;

said second means is a second flow measuring device for measuring flow during operation of said molecular oxygen-containing stream into said first zone and for transmitting said molecular oxygen-amount signal to said third means; and said third means is a computer means for: (i) calculating a total amount of oxygen in said oxygen-containing stream and a total amount of hydrogen sulfide in said hydrogen sulfide-containing stream which enters during operation into said first zone based upon signals representative of said flow determined by said first and said second flow measuring devices, and (ii) generating said comparison signal representative of the relative amount of hydrogen sulfide to molecular oxygen.

3. In the sulfur plant of claim 1, wherein said fourth means is a detector which produces a signal proportional to the intensity of radiation entering said detector from within said first zone.

4. In the sulfur plant of claim 3, said radiation entering said detector has at least one wave length in the range of about 0.3 microns to about 10 microns.

5. In the sulfur plant of claim 4, wherein said at least one wave length is in the range of about 0.3 microns to about 7 microns.

6. The sulfur plant of claim 1, wherein said fifth means comprises a powered valve capable of changing flow rate of at least said first hydrogen sulfide-containing stream in response to said two signals, wherein, provided mole ratio of molecular oxygen to hydrogen sulfide entering said first zone is greater than 3 to 2, said flow rate of said first hydrogen sulfide-containing stream is increased to increase temperature in said first zone and decreased to lower temperature in said first zone, and wherein, provided mole ratio of molecular oxygen to hydrogen sulfide entering said first zone is less than 3 to 2, said flow rate is decreased to raise temperature in said first zone and increased to lower temperature in said first zone, provided flow rate of said molecular oxygen-containing stream is substantially constant.

* * * * *

UNITED STATES PATENT AND TRADEMARK OFFICE
CERTIFICATE OF CORRECTION

PATENT NO. : 4,438,069
DATED : March 20, 1984
INVENTOR(S) : Lee G. Peterman and Raymond J. Staebel It is certified that error appears in the above-identified patent and that said Letters Patent are hereby corrected as shown below:

Column 6, line 33: Cancel "224s" and insert--224--.
Column 6, line 37: Cancel "catylytic" and insert--catalytic--.
Column 6, line 53: Cancel "107" and insert--109--.
Column 7, line 63: Cancel "Switch" in the first occurrence and insert--switch--.
Column 8, line 62: Cancel "dertermined" and insert--determined--.
Column 9, line 49: After "transmitted", insert--via switch 156--.
Column 9, line 49: After "control 129", cancel "via switch 156".
Column 10, line 14: Cancel "PPB" and insert--ppb--.
Column 10, line 17: Cancel "PPB" in both occurrences and insert in both occurrences--ppb--.
Column 11, line 60: Cancel "Computer" and insert--computer--.
Column 12, line 65: Cancel "198" and insert--160--.

Signed and Sealed this

Seventeenth Day of September 1985

[SEAL]

Attest:

DONALD J. QUIGG

Attesting Officer

Commissioner of Patents and Trademarks—Designate